(12) United States Patent
Hirakata et al.

(10) Patent No.: US 7,411,085 B2
(45) Date of Patent: Aug. 12, 2008

(54) CARBON NANOTUBE DISPERSION, PRODUCTION METHOD OF CARBON NANOTUBE STRUCTURE AND CARBON NANOTUBE STRUCTURE

(75) Inventors: Masaki Hirakata, Kanagawa (JP); Taishi Shigematsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/723,652

(22) Filed: Mar. 21, 2007

(65) Prior Publication Data
US 2008/0103329 A1     May 1, 2008

(30) Foreign Application Priority Data
Sep. 29, 2006    (JP) .............................. 2006-266747

(51) Int. Cl.
*C07C 69/74* (2006.01)
(52) U.S. Cl. ..................................... 560/116; 977/788
(58) Field of Classification Search ........................ None
See application file for complete search history.

(56) References Cited

U.S. PATENT DOCUMENTS

2007/0276072 A1* 11/2007 Schmidt et al. ............. 524/410

FOREIGN PATENT DOCUMENTS

| JP | A 2002-503204 | 1/2002 |
| JP | A 2002-226209 | 8/2002 |
| JP | A 2004-2156 | 1/2004 |
| JP | A 2005-524000 | 8/2005 |
| JP | A 2006-64693 | 3/2006 |
| WO | WO 97/32571 | 9/1997 |
| WO | WO 03/091486 A1 | 11/2003 |
| WO | WO 2005/075548 A2 * | 8/2005 |

OTHER PUBLICATIONS

E.S. Snow et al. "Random networks of carbon nanotubes as an electronic material," Applied Physics Letters, vol. 82, No. 13, pp. 2145-2147, Mar. 31, 2003.
Zhuangchun Wu et al., "Transparent, Conductive Carbon Nanotube Films," Science, vol. 305, pp. 1273-1276, Aug. 27, 2004.

* cited by examiner

*Primary Examiner*—Paul A Zucker
(74) *Attorney, Agent, or Firm*—Oliff & Berridge, PLC

(57) ABSTRACT

A carbon nanotube dispersion includes a carbon nanotube compound represented by structural formula A and a dispersion medium in which the carbon nanotube is dispersed or dissolved,

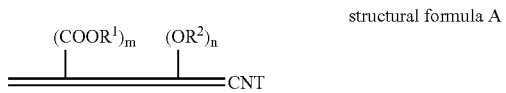

structural formula A wherein a moiety represented by double lines represents a carbon nanotube $R^1$ represents a hydrogen atom, a substituted or unsubstituted alkyl group having one or two carbon atoms, a substituted or unsubstituted aryl group or a substituted or unsubstituted carbodiimide group, $R^2$ represents a substituted or unsubstituted alkyl group having from 1 to 4 carbon atoms, and m and n each independently represents an integer of 1 or more.

15 Claims, 4 Drawing Sheets

1 μm

AFM IMAGES (10,000 X MAGNIFICATION) OF
CARBON NANOTUBE FILM OF EXAMPLE 1
(SURFACE OF HYDROPHILIC SUBSTRATE)

1 μm

AFM IMAGES (10,000 X MAGNIFICATION) OF CARBON
NANOTUBE FILM OF COMPARATIVE EXAMPLE 1
(SURFACE OF HYDROPHILIC SUBSTRATE)

1 μm

AFM IMAGES (10,000 X MAGNIFICATION) OF
CARBON NANOTUBE FILM OF EXAMPLE 2
(SURFACE OF HYDROPHILIC SUBSTRATE)

EXAMPLE 1

EXAMPLE 2

1 μm

AFM IMAGES (10,000 X MAGNIFICATION) OF CARBON
NANOTUBE FILM OF EXAMPLES 1 AND 2
(SURFACE OF HYDROPHOBIC SUBSTRATE)

CARBON NANOTUBE DISPERSION, PRODUCTION METHOD OF CARBON NANOTUBE STRUCTURE AND CARBON NANOTUBE STRUCTURE

CROSS-REFERENCE TO RELATED APPLICATIONS

This application is based on and claims priority under 35 USC 119 from Japanese Patent Application No. 2006-266747 filed on Sep. 29, 2006.

BACKGROUND

1. Technical Field

The present invention relates to a carbon nanotube dispersion suitable for the formation of a carbon nanotube film, a production method of a carbon nanotube structure from the carbon nanotube dispersion and a carbon nanotube structure obtained by the production method.

2. Related Art

In recent years, transparent electrodes and transparent TFT's have been under active development aiming at the application to flat panel display. As one of materials favorable for these products, carbon nanotubes have attracted attention. In order to apply the carbon nanotubes to transparent electrodes and transparent TFT's, the carbon nanotubes are required to form a thin film uniformly on a certain substrate.

SUMMARY

According to an aspect of the invention, there is provided a carbon nanotube dispersion including a carbon nanotube compound represented by structural formula A and a dispersion medium in which the carbon nanotube is dispersed or dissolved,

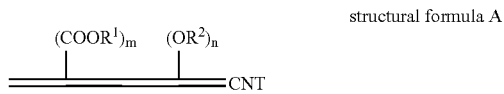

structural formula A wherein a moiety represented by double lines represents a carbon nanotube, $R^1$ represents a hydrogen atom, a substituted or unsubstituted alkyl group having one or two carbon atoms, a substituted or unsubstituted aryl group or a substituted or unsubstituted carbodiimide group, $R^2$ represents a substituted or unsubstituted alkyl group having from 1 to 4 carbon atoms, and m and n each independently represents an integer of 1 or more.

BRIEF DESCRIPTION OF THE DRAWINGS

Exemplary embodiment(s) of the present invention will be described in detail based on the following figures, wherein.

DETAILED DESCRIPTION

Figure 1:
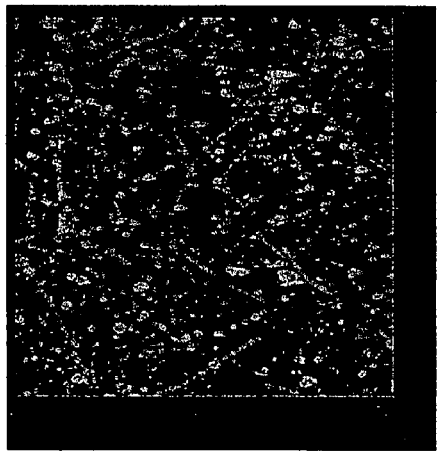
FIG. 1 is a view showing AFM images (10,000× magnification) of a carbon nanotube film formed on the surface of a hydrophilic substrate by the carbon nanotube dispersion of Example 1.
Figure 1:
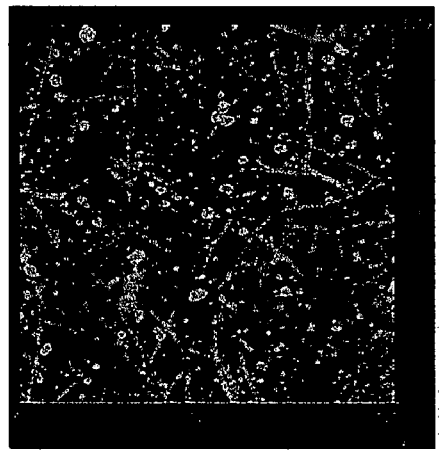
Figure 1:
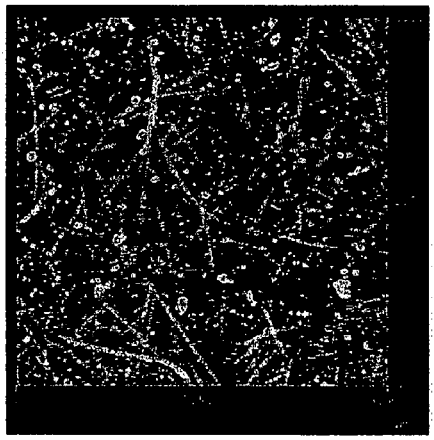
Figure 1:
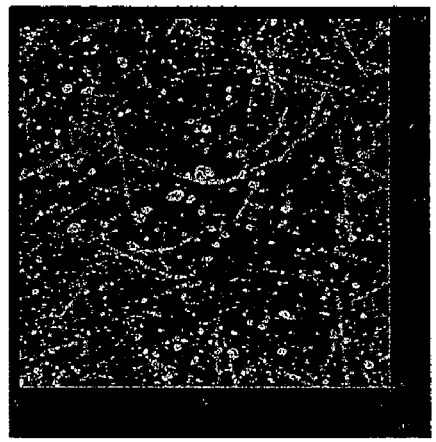

The carbon nanotube dispersion, the production method of the carbon nanotube structure and the carbon nanotube structure thus obtained will be further described sequentially hereinafter.

[Carbon Nanotube Dispersion]

The carbon nanotube dispersion of the invention includes at least a carbon nanotube compound represented by the following structural formula A and a dispersion medium for dispersing or dissolving the carbon nanotube therein:

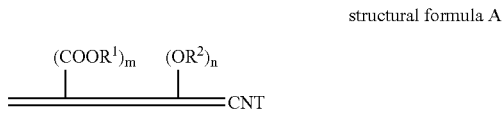

structural formula A wherein the moiety represented by the double lines represents a carbon nanotube; $R^1$ represents a hydrogen atom, a substituted or unsubstituted alkyl group having one or two carbon atoms, a substituted or unsubstituted aryl group or a substituted or unsubstituted carbodiimide group; $R^2$ represents a substituted or unsubstituted alkyl group having from one to four carbon atoms; and m and n each independently represent an integer of 1 or more.

In the carbon nanotube dispersion of the invention, the carbon nanotubes are essentially kept dispersed in the dispersion. However, in the case where a carbon nanotube having a functional group is mixed with a dispersion medium having a high affinity or like cases, the carbon nanotubes may be dispersed so uniformly as to be considered dissolved therein rather than dispersed. In the invention, the carbon nanotubes may be kept in any of the two states and thus are expressed dispersed or dissolved. In the following description, however, the terms "dispersed" and "dissolved" will not be definitely distinguished therebetween. Only the expression "dispersed" will be used.

<Carbon Nanotube>

In the invention, the carbon nanotube which is a main constituent (carbon nanotube CNT constituting the skeleton in the structural formula A) may be either a single-walled carbon nanotube or a multi-walled carbon nanotube composed of two or more layers. Which one of the two carbon nanotubes should be used or whether or not the two carbon nanotubes should be used may be properly determined depending on the purpose. For example, in the case where the carbon nanotube dispersion is used to obtain a carbon nanotube structure the electrical characteristics of which is made the use of, there may be a case where a semiconducting single-walled carbon nanotube is preferably used.

In the invention, as the carbon nanotube there may be used one which is not in the form of tube strictly such as carbon nanohorn which is a modification of single-walled carbon nanotube (horn type carbon nanotube which continuously rises in diameter from one end to the other end thereof), carbon nanocoil (generally spiral coil type carbon nanotube), carbon nanobead (carbon nanotube having a tube piercing a spherical bead made of amorphous carbon, etc.), cup stack type carbon nanotube and carbon nanotube covered by carbon nanohorn or amorphous carbon on the periphery thereof.

In the invention, as the carbon nanotube there may be also used a carbon nanotube having some materials encapsulated therein such as metal-encapsulated carbon nanotube having a metal or the like encapsulated in carbon nanotube and peapod carbon nanotube having a metal-encapsulated fullerene encapsulated in carbon nanotube.

As mentioned above, in the invention, any forms of carbon nanotube such as modification of ordinary carbon nanotube and carbon nanotube having various modifications may be also used without any problem from the standpoint of reactivity. Accordingly, the term "carbon nanotube" as used herein is meant to include all these forms of carbon nanotube as concept.

The synthesis of these carbon nanotubes can be carried out by any of arc discharge method, laser ablation method and CVD method, which have heretofore been known. Thus, the synthesis method is not limited. Preferred among these methods is arc discharge method in a magnetic field because a high purity carbon nanotube can be synthesized.

The diameter of the carbon nanotube to be used herein is preferably from not smaller than 0.3 nm to not greater than 100 nm. When the diameter of the carbon nanotube exceeds the above defined range, the carbon nanotube can be difficultly synthesized to disadvantage from the standpoint of cost. However, there are no special problems from other standpoints of view. The upper limit of the diameter of the carbon nanotube is more preferably 30 nm or less.

On the other hand, the lower limit of the diameter of the carbon nanotube is normally about 0.3 nm from the structural standpoint of view. However, when the diameter of the carbon nanotube is too small, it may be disadvantageous in that the yield in synthesis decreases. From this standpoint of view, the lower limit of the diameter of the carbon nanotube is more preferably 1 nm or more, even more preferably 10 nm or more. However, from other standpoints of view, it is not necessary that the lower limit of the diameter of the carbon nanotube be taken into account.

The length of the carbon nanotube to be used herein is preferably from not smaller than 0.1 μm to not greater than 100 μm. When the length of the carbon nanotube exceeds the above defined range, it is disadvantageous in cost because the synthesis of the carbon nanotube can be difficultly made or requires a special method. When the length of the carbon nanotube falls below the above defined range, it is disadvantageous in that the number of functional groups ($COOR^1$, $OR^2$) which can be added to one carbon nanotube is reduced. From this standpoint of view, the upper limit of the length of the carbon nanotube is more preferably 10 μm or less. The lower limit of the length of the carbon nanotube is more preferably 1 μm or more. However, from other standpoints of view, it is not necessary that the upper and lower limits of the length of the carbon nanotube be taken into account.

In the case where the purity of the carbon nanotube to be used herein is not high enough, it is preferred that the carbon nanotube be previously purified to have a raised purity before the synthesis of the carbon nanotube compound. In the invention, the purity of the carbon nanotube thus purified is preferably as high as possible. In some detail, the purity of the carbon nanotube thus purified is preferably 90% or more, more preferably 95% or more. When the purity of the carbon nanotube thus purified is low, the resulting dispersion has carbon products such as amorphous carbon and tar incorporated therein, occasionally making it impossible to obtain the desired characteristics. The method for the purification of the carbon nanotube is not specifically limited. Any relationship method may be employed.

<Functional Group>

$R^1$ in the structural formula A is a hydrogen atom, a substituted or unsubstituted alkyl group having one or two carbon atoms, a substituted or unsubstituted aryl group or a substituted or unsubstituted carbodiimide group. Preferred among these groups $R^1$ are hydrogen atom and substituted or unsubstituted alkyl group having one or two carbon atoms from the standpoint of ease of synthesis, yield, etc. In the case where the carbon nanotube dispersion is used to produce a carbon nanotube structure, R1 is preferably a hydrogen atom or substituted or unsubstituted alkyl group having one or two carbon atoms, particularly preferably an unsubstituted alkyl group having one or two carbon atoms from the standpoint of availability and reactivity of the corresponding crosslinking agent. From other standpoints of view, $R^1$ may be any of these groups. Whether or not the alkyl group or carbodiimide group should be substituted is not specifically limited. Depending on the purpose, the alkyl group or carbodiimide group may be preferably substituted by a proper substituent.

On the other hand, $R^2$ in the structural formula A is a substituted or unsubstituted alkyl group having from one to four carbon atoms. Preferred among these alkyl groups is substituted or unsubstituted alkyl group having one or two carbon atoms, particularly preferably unsubstituted alkyl group.

The number (m and n) of functional groups ($COOR^1$ and $OR^2$) per carbon nanotube are not specifically limited and cannot be unequivocally defined depending on the length of the carbon nanotube or the purpose of the carbon nanotube dispersion (and the carbon nanotube structure produced therefrom) so far as they are each independently 1 or more. The number m of $COOR^1$ groups is preferably 2 or more, more preferably 3 or more in the case where it is desired to produce a carbon nanotube structure having a crosslinked structure and hence a network structure.

On the other hand, the number n of $OR^2$ groups is preferably as many somewhat as possible, though depending on the length of the carbon nanotube itself, to make the carbon nanotube fairly dispersible in the carbon nanotube dispersion. Accordingly, the number of $OR^2$ groups is preferably 2 or more, more preferably 3 or more.

<Carbon Nanotube Compound>

To the aforementioned carbon nanotube are added the aforementioned predetermined functional groups to synthesize a carbon nanotube compound which is then supplied to prepare the carbon nanotube dispersion of the invention. The functional groups to be added to the carbon nanotube are $COOR^1$ and $OR^2$. In other words, the compound represented by the structural formula A is the carbon nanotube compound of the invention.

It is known that when the carboxyl group COOH is actually incorporated in the carbon nanotube, a hydroxyl group OH, too, is automatically incorporated in the carbon nanotube at the same time. Accordingly, in order to incorporate $COOR^1$ and $OR^2$ in the carbon nanotube, the carboxyl group COOH may be incorporated in the carbon nanotube (hydroxyl group OH is incorporated at the same time). The carbon nanotube may then be reacted such that the hydrogen atom in COOH and OH thus added are substituted by desired groups.

It goes without saying that when a carbon nanotube having a carboxyl group COOH is used as a starting material, it may be reacted such that the hydrogen atom in the carboxyl group COOH and the hydroxyl group OH added to the carbon nanotube are substituted by desired groups. Alternatively, COOR$^1$ may be directly introduced into the carbon nanotube which is then reacted such that the hydrogen atom in the hydroxyl group OH added thereto is substituted by desired groups.

The method for introducing the carboxyl group COOH (The term "introduction of carboxyl group COOH" as used hereinafter is meant to indicate the introduction of hydroxyl group OH as well) is not specifically limited. Any known method may be employed as it is. Alternatively, the carbon nanotube may be given a mechanochemical force so that the graphene sheet on the surface of the carbon nanotube is extremely partly destroyed or modified. A carboxyl group COOH is then introduced into the destroyed or modified graphene sheet (Alternatively, COOR$^1$ may be introduced directly into the destroyed or modified graphene sheet). Further, when a carbon nanotube having many defects on the surface thereof at the time of production such as cup stack type carbon nanotube and carbon nanotube produced by gas phase growth method is used, functional groups can be relatively easily introduced.

Further, various methods are disclosed in Patent Reference 2. These methods can be used also in the invention depending on the purpose. In recent years, carbon nanotubes having carboxyl group COOH added thereto have been already marketed and thus are commercially available. Of course, these commercially available products may be used in the invention.

An example of the method for the synthesis of the carbon nanotube compound represented by the structural formula A will be described hereinafter.

In order to introduce —COOR$^1$ and OR$^2$ into a carbon nanotube, a carboxyl group COOH is introduced into the carbon nanotube (i). The hydrogen atom in the hydroxyl group OH which has been concomitantly added is then alkylated (ii). The carboxyl group COOH is then esterified (iii). Of course, when R$^1$ is a hydrogen atom, the carboxyl group COOH may be merely added without being esterified (i).

(i) Addition of Carboxyl Group

In order to introduce a carboxyl group into the carbon nanotube, the carbon nanotube may be refluxed with an oxidizing acid. This operation is desirable because it is relatively easy and allows the addition of a carboxyl group rich in reactivity. This operation will be briefly described below.

Examples of the oxidizing acid employable herein include concentrated nitric acid, hydrogen peroxide, mixture of sulfuric acid and nitric acid, and aqua regia. In particular, the concentration of concentrated nitric acid, if used, is preferably 5% by mass or more, more preferably 60% by mass or more.

Refluxing may be carried out by any ordinary method. The refluxing temperature is preferably close to the boiling point of the acid used. For example, when concentrated nitric acid is used, the refluxing temperature is preferably from 120° C. to 130° C. The refluxing time is preferably from 30 minutes to 20 hours, more preferably from 1 hour to 8 hours.

In the reaction solution obtained after refluxing, a carbon nanotube having a carboxyl group COOH (and hydroxyl group OH) added thereto (carbon nanotube carboxylic acid) is found to have been produced. The reaction solution is allowed to cool to room temperature, and then optionally subjected to separation or washing to obtain the desired carbon nanotube carboxylic acid.

(ii) Alkoxylation of Hydroxyl Group

By adding an alkoxylating agent to the carbon nanotube carboxylic acid having a hydroxyl group added thereto, the desired functional group —OR$^2$ can be introduced into the carbon nanotube carboxylic acid.

The alkoxylating agent to be used herein may be selected depending on R$^2$ in the desired functional group. For example, when R$^2$ is CH$_3$, halogenated methyl, dimethyl sulfate or the like may be used.

(iii) Esterification of Carboxyl Group

By adding an alcohol to the carbon nanotube carboxylic acid having its hydroxyl group alkoxylated and then dehydrating the alcohol so that it is esterified, the desired functional group —COOR$^1$ can be introduced into the carbon nanotube.

The alcohol to be used in the aforementioned esterification is determined depending on R$^1$ in the general formula of the aforementioned functional group. In other words, when R is CH$_3$, the alcohol is methanol. When R is C$_2$H$_5$, the alcohol is ethanol.

In general, esterification is effected in the presence of a catalyst. In the invention, too, any known catalyst such as sulfuric acid, hydrochloric acid and toluenesulfonic acid may be used. In the invention, as the catalyst there is preferably used sulfuric acid from the standpoint of prevention of the occurrence of side reactions.

The aforementioned esterification may be carried out by heating the carbon nanotube carboxylic acid having its hydroxyl group alkoxylated with an alcohol in the presence of a catalyst at a proper temperature for a proper period of time. The refluxing temperature and time conditions vary with the kind of the catalyst and alcohol used, etc. and thus cannot be unequivocally defined. However, the refluxing temperature is preferably close to the boiling point of the alcohol used. For example, when methanol is used, the refluxing temperature is preferably from 60° C. to 70° C. The refluxing time is preferably from 1 to 20 hours, more preferably from 4 to 6 hours.

The reaction product is separated from the reaction solution obtained after esterification, and then optionally washed to obtain a carbon nanotube compound having a functional group —COOR$^1$ and a hydroxyl group OR$^2$ added thereto.

The content of the carbon nanotube compound in the carbon nanotube dispersion of the invention varies with the purpose of the carbon nanotube dispersion, the length and thickness of the carbon nanotube, which the carbon nanotube is single-walled or multi-walled, the kind and amount of the functional groups contained in the carbon nanotube, whether or not any crosslinking agent is used, the kind and amount of the crosslinking agent, whether or not any dispersion medium or other additives are used, the kind and amount of the dispersion medium or other additives, etc. and thus cannot be unequivocally defined.

When used for the purpose of producing a carbon nanotube structure, the carbon nanotube is preferably in so high a concentration that it can be properly dispersed in the carbon nanotube structure thus produced. Further, in order to crosslink the carbon nanotube components to each other so that they are cured, the carbon nanotube is preferably in so high a concentration that it forms a good structure when cured. However, the carbon nanotube is preferably not in too high a concentration to prevent the deterioration of spreadability.

The specific proportion of the carbon nanotube to be incorporated in the dispersion cannot be unequivocally defined as previously mentioned. However, the proportion of the carbon nanotube, excluding the mass of the functional groups, is from about 0.01 to 10 g/l, preferably from about 0.1 to 5 g/l, more preferably from about 0.5 to 1.5 g/l based on the total amount of the carbon nanotube dispersion.

<Crosslinking Agent>

The carbon nanotube dispersion of the invention includes a crosslinking agent incorporated therein as necessary. As the crosslinking agent there may be any crosslinking agent that causes the crosslinking reaction with the aforementioned functional group —$COOR^1$ contained in the carbon nanotube. The conditions of curing by the crosslinking reaction (heating, irradiation with ultraviolet ray, irradiation with visible light, natural curing, etc.) are automatically determined by the combination of these additives.

Specific preferred examples of the aforementioned crosslinking agent include polyols, polyamines, polycarbodiimide, ammonium complexes, and polyisocynates. At least one crosslinking agent is preferably selected from the group consisting of these compounds. The combination of functional group contained in the carbon nanotube and corresponding crosslinking agent capable of causing crosslinking reaction is set forth in Table 1 with its curing condition.

TABLE 1

| Functional group contained in carbon nanotube compound | Crosslinking agent | Curing condition |
| --- | --- | --- |
| —COOR | Polyol | Heat curing |
| —COOR | Polyamine | Heat curing |
| —COOR | Ammonium complex | Heat curing |
| —COOR | Congo red | Heat curing |
| —COOR | cis-Platin | Heat curing |
| —COOH | Polyamine | Heat curing |
| —COOH | Polycarbodiimide | Heat curing |
| —COOH | Ammonium complex | Heat curing |
| —COOH | Hydroquinone | Heat curing |

*R is a substituted or unsubstituted alkyl group having one or two carbon atoms, a substituted or unsubstituted aryl group or substituted or unsubstituted carbodiimide group.

Preferred among these combinations are combination of —COOR (in which R is a substituted or unsubstituted alkyl group having one or two carbon atoms, a substituted or unsubstituted aryl group or substituted or unsubstituted carbodiimide group) which is fairly reactive on the functional group side thereof and polyol, polyamine, ammonium complex, Congo red and cis-platin.

The term "polyol" as used herein means a generic term of an organic compound having two or more OH groups. Preferred among these organic compounds are those having from 2 to 10 carbon atoms (more preferably from 2 to 5 carbon atoms) and from 2 to 22 OH groups (more preferably from 2 to 5 OH groups) from the standpoint of crosslinking properties, adaptability to dispersing medium in the case where the organic compound is excessively added, disposability of waste liquid after biodegradation reaction (environmental adaptability), yield in synthesis of polyol, etc. In particular, the number of carbon atoms is preferably as small as possible within the above defined range to reduce the gap between the carbon nanotubes in the carbon nanotube structure produced from the carbon nanotube dispersion of the invention to an extent such that they are substantially in contact with each other (brought close to each other). In some detail, the organic compound is particularly preferably glycerin or ethylene glycol. It is preferred that either one or both of glycerin and ethylene glycol be used as crosslinking agent.

From another standpoint of view, the aforementioned crosslinking agent is preferably a non-self-polymerizable crosslinking agent. In addition to glycerin and ethylene glycol, which have been exemplified above as example of polyol, butenediol, hexinediol, hydroquinone and naphthalenediol are, of course, non-self-polymerizable crosslinking agents.

Explaining more generally, the non-self-polymerizable crosslinking agent is required to have no sets of functional groups therein that cause mutual polymerization reaction. Conversely speaking, self-polymerizable crosslinking agents include those having a set of functional groups therein that cause mutual polymerization reaction (e.g., alkoxide).

<Dispersion Medium>

In the carbon nanotube dispersion of the invention, the dispersion medium in which the already described carbon nanotube compound is dispersed is not specifically limited. In general, however, water or water-soluble solvent called aqueous solvent is used. In the case where the aforementioned crosslinking agent is incorporated, it normally exhibits the function of dispersion medium and preferably acts also as dispersion medium. Thus, it is not necessary that a dispersion medium be separately added. However, a dispersion medium may be further added in the case where the single use of the aforementioned crosslinking agent does not give a sufficient spreadability or like cases.

The dispersion medium employable herein is not specifically limited and may be selected depending on the kind of the crosslinking agent used. Specific examples of the dispersion medium employable herein include water-soluble solvents such as methanol, ethanol, isopropanol, n-propanol, butanol, methyl ethyl ketone, toluene, benzene, acetone, chloroform, methylene chloride, acetonitrile, diethyl ether and tetrahydrofurane (THF), and water-containing solvents such as water, aqueous acid solution and aqueous alkali solution. Such a water-soluble solvent and water (including water in water-containing solvent) may be used singly or in admixture thereof. All the compounds exemplified above as crosslinking agent correspond to water-soluble solvents.

The added amount of these solvents may be properly predetermined taking into account spreadability but are not specifically limited.

<Other Additives>

The carbon nanotube dispersion of the invention may include various additives such as viscosity adjustor, dispersion medium and crosslinking accelerator incorporated therein. In the light of the advantage of the invention that no impurities are contained, however, the incorporation of excess amount of additives is ridiculous. Further, since the carbon nanotube dispersion of the invention is fairly dispersed, it is highly likely that even if no dispersion medium is added, the desired function can be attained.

However, in the case where it is desired to provide the carbon nanotube dispersion with desired functions or keep the carbon nanotube dispersion further dispersed, various proper additives may be positively added. In the case where it is intended to crosslink the carbon nanotube dispersion by condensation reaction or the like rather than with crosslinking agent to form a carbon nanotube structure, an additive for bonding functional groups may be added. For details of additive for bonding functional groups, reference can be made to Clause <Crosslinking step> in Paragraph [Process for the production of carbon nanotube structure].

The viscosity adjustor is added in the case where the single use of the aforementioned crosslinking agent or additive for bonding functional groups does not give sufficient spreadability. The viscosity adjustor employable herein is not specifically limited and may be properly selected depending on the kind of the crosslinking agent or the additive for bonding functional groups. Specific examples of the viscosity adjustor employable herein include methanol, ethanol, isopropanol, n-propanol, butanol, methyl ethyl ketone, toluene, benzene, acetone, chloroform, methylene chloride, acetonitrile, diethyl ether, and THF.

Among these viscosity adjustors are those which act as dispersion medium depending on the added amount thereof. However, it is not significant to distinguish the two functions definitely. The added amount of such a viscosity adjustor may be properly predetermined taking into account spreadability but is not specifically limited.

As dispersion mediums which can be auxiliarily added there may be used various known surface active agents, water-soluble organic solvents, water, aqueous acid solutions, aqueous alkali solutions, etc.

<Preparation of Carbon Nanotube Dispersion>

The carbon nanotube dispersion of the invention is obtained by mixing the aforementioned components so that they are dissolved or dispersed. In some detail, at least the aforementioned carbon nanotube compound is dissolved or dispersed in the aforementioned dispersion medium (which may act also as crosslinking agent). In the case where the crosslinking agent or other additives described above in Clause <Other additives> are incorporated, they, too, are subjected to mixing. By adjusting the added amount of the dispersion medium and viscosity adjustor taking into account spreadability, the carbon nanotube dispersion of the invention adapted to be supplied onto (spread over) the substrate can be prepared.

The mixing of these components may be carried out simply by stirring with a spatula or by an agitating blade type stirrer, a magnetic stirrer or an agitating pump. In order to disperse the carbon nanotube compound more uniformly so that the storage stability of the carbon nanotube dispersion can be raised or the carbon nanotube structure, if produced, can be entirely provided with a network structure formed by the crosslinking of carbon nanotubes, an ultrasonic dispersing machine or homogenizer may be used to cause powerful dispersion. However, when an agitator having a high agitation shearing force such as homogenizer is used, the carbon nanotubes contained in the system can be cut or damaged. Accordingly, agitation by such a machine should be effect for a short period of time.

[Process for the Production of Carbon Nanotube Structure]

The process for the production of the carbon nanotube structure of the invention includes a preparation step of preparing a carbon nanotube dispersion having at least a carbon nanotube compound represented by the following structural formula A dispersed or dissolved in a dispersion medium and a supplying step of supplying the carbon nanotube dispersion thus obtained onto the surface of a substrate:

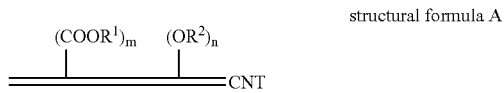

structural formula A wherein the moiety represented by the double lines represents a carbon nanotube; $R^1$ represents a hydrogen atom, a substituted or unsubstituted alkyl group having one or two carbon atoms, a substituted or unsubstituted aryl group or a substituted or unsubstituted carbodiimide group; $R^2$ represents a substituted or unsubstituted alkyl group having from one to four carbon atoms; and m and n each independently represent an integer of 1 or more.

In order to form a carbon nanotube structure having a crosslinked network structure, the supplying step is preferably followed by a crosslinking step of chemically bonding functional groups containing $R^1$ in the structural formula A to each other so that they are crosslinked to each other.

The various steps will be described hereinafter.

<Preparation Step>

The term "preparation step" as used herein is meant to indicate a step of preparing a carbon nanotube dispersion having at least a carbon nanotube compound represented by the structural formula A dispersed or dissolved in a dispersion medium, i.e., the aforementioned carbon nanotube dispersion of the invention. For details of the preparation step, reference can be made to Clause <Preparation of carbon nanotube dispersion> in Paragraph [Carbon nanotube dispersion].

<Supplying Step>

The term "supplying step" as used herein is meant to indicate a step of supplying the carbon nanotube dispersion obtained at the preparation step onto the surface of a proper substrate. At the supplying step, the aforementioned carbon nanotube dispersion does not necessarily need to be supplied onto the entire surface of the substrate.

At the present step, the supply of the carbon nanotube dispersion may be accomplished simply by spreading the carbon nanotube dispersion over the surface of the substrate. By spreading the carbon nanotube dispersion, a layer for forming a film-like carbon nanotube structure (A film-like matter will occasionally be referred to as "carbon nanotube film") can be simply supplied at reduced cost in a short period of time.

The spreading method is not specifically limited. Any of a wide variety of spreading methods such as method which includes merely dropping a droplet which is then spread by a squeegee and ordinary coating method may be employed. Examples of ordinary coating methods include spin coating method, wire bar coating method, cast coating method, roll coating method, brush coating method, dip coating method, spray coating method, and curtain coating method.

The supply of the carbon nanotube dispersion can be accomplished simply by spreading as described above. However, any method may be employed so far as the carbon nanotube dispersion can be supplied onto the surface of the substrate. For example, the carbon nanotube dispersion can be poured into a mold having a desired shape. In this case, the "mold" corresponds to the substrate. The "surface of substrate" indicates the surface of the interior of the mold with which the carbon nanotube dispersion comes in contact. By properly designing the shape of the mold, a carbon nanotube structure having an arbitrary shape can be produced.

The aforementioned substrate indicates the object from which the carbon nanotube structure is formed. The material and shape of the substrate are not limited. In the case of a material which itself is not the object from which the carbon nanotube structure is formed and is allowed to act as a so-called "peel paper" when the carbon nanotube structure thus formed is peeled off or allowed to act as a so-called "transfer paper" when the carbon nanotube structure thus formed is transferred onto other members, it becomes a "substrate" which is the object from which the carbon nanotube is formed as defined herein. Of course, in this case, the material of the substrate is not required to be "paper".

The aforementioned substrate is normally a tabular or sheet-like board. In the invention, however, the substrate is not required to be a board. It suffices only when at least the surface of the substrate onto which the carbon nanotube dispersion is supplied has some planes the surface of which is preferably smooth.

Specific examples of the substrate material include silicon wafer, quartz glass, sapphire, and fluororesin (e.g., Teflon®).

In the case where the dispersion medium to be used at the preparation step contains water and/or water-soluble solvent, as the substrate there is preferably used a substrate having a hydrophilic surface or a substrate the surface of which is hydrophilicized.

Examples of the substrate having a hydrophilic surface include those made of various metal materials, quartz glass and sapphire.

The method for hydrophilicizing the surface of the substrate is not specifically limited. Any proper known hydrophilicizing method may be employed. Specific preferred examples of the hydrophilicizing method include ultraviolet (UV) ashing, and plasma ashing.

The desired degree of hydrophilicity depends on the kind of the dispersion medium used or the desired homogeneity or other properties and thus is not specifically limited, but the contact angle of the surface of the substrate with respect to water is preferably 40° or less, more preferably 20° or less.

<Crosslinking Step>

The term "crosslinking step" as used herein is meant to indicate a step of chemically bonding functional groups containing $R^1$ in the structural formula A so that they are crosslinked to each other. In order to form a carbon nanotube structure having a crosslinked network structure, the present step is preferably effected separately. However, in the case where the crosslinking reaction proceeds even when the carbon nanotube dispersion is allowed to stand, the present step does not need to be effected.

In the case where the foregoing supplying step involves the spreading of the carbon nanotube dispersion, the crosslinking step is a step of curing the dispersion thus spread to form a carbon nanotube film constituting the aforementioned network structure having carbon nanotubes crosslinked to each other. The region in which the carbon nanotube dispersion should be cured to form a carbon nanotube structure at the crosslinking step may be arbitrary so far as it contains all desired regions. It is not necessary that the carbon nanotube dispersion which has been supplied onto the surface of the substrate be entirely cured.

As already described, in the case where the crosslinking agent for accelerating crosslinking reaction is incorporated in the carbon nanotube dispersion, the operation at the crosslinking step is automatically determined depending on the combination of the kind of the functional group $COOR^1$ and the crosslinking agent as set forth in Table 1 above. In the case where heat curing is combined, heating may be carried out by various heaters or the like. In the case where ultraviolet curing is combined, the carbon nanotube dispersion may be irradiated with light from ultraviolet lamp or may be allowed to stand under the sun. Of course, in the case where natural curing is combined, it suffices if the carbon nanotube dispersion is allowed to stand as it is.

In the case where a carbon nanotube having a functional group —$COOR^1$ added thereto in which $R^1$ is a substituted or unsubstituted alkyl group having one or two carbon atoms a substituted or unsubstituted aryl group or a substituted or unsubstituted carbodiimide group and a polyol (in particular, glycerin and/or ethylene glycol) are combined, heat curing (polyesterification by ester exchange reaction) is effected. Heating causes —COOR in the esterified carbon nanotube carboxylic acid and R'—OH in the polyol (in which R' is a substituted or unsubstituted hydrocarbon group which is preferably selected from the group consisting of —$C_nH_{2n-1}$, —$C_nH_{2n}$ and —$C_nH_{2n+1}$ (in which n is an integer of from 1 to 10), including substitution products thereof) to undergo ester exchange reaction. Subsequently, a plurality of such reactions proceed on multiple basis to cause carbon nanotubes to be crosslinked. Finally, a carbon nanotube structure having a network structure having carbon nanotubes connected to each other is formed.

Specifically exemplifying preferred conditions in the aforementioned combination, the heating temperature is preferably from 50° C. to 500° C., more preferably from 120° C. to 200° C. The heating time in this combination is preferably from 1 minute to 10 hours, more preferably from 1 to 2 hours.

The crosslinking step may include a crosslinking operation involving direct chemical bonding of functional groups —$COOR^1$ to each other without any crosslinking agent. As the reaction of chemically bonding the functional groups there may be used dehydration condensation.

In order to chemically bond the functional groups, an additive for causing the chemical bonding of the functional groups (functional group bonding additive) may be used. As such an additive there may be used any additive capable of reacting the functional groups contained in the carbon nanotube with each other.

In the case where the reaction causing the chemical bonding of the functional groups to each other is dehydration condensation, a condensation agent is preferably added as the functional group bonding additive. Specific preferred examples of the condensation agent include acid catalysts, dehydration condensation agents such as sulfuric acid, N-ethyl-N'-(3-dimethylaminopropyl)carbodiimide, and dicyclohexyl carbodiimide. At least one condensation agent selected from the group consisting of these condensation agents is preferably used.

As the aforementioned functional group to be used in dehydration condensation there is particularly preferably used —COOH. The introduction of a carboxyl group into the carbon nanotube is relatively easy. Further, the material thus obtained (carbon nanotube carboxylic acid) is rich in reactivity. Therefore, the functional group for forming the network structure can be easily introduced into plural sites on one carbon nanotube. Further, this functional group can be easily dehydration-condensed and thus is suitable for the formation of the crosslinked network structure. In the case where the aforementioned functional group to be used in dehydration condensation is —COOH, sulfuric acid, N-ethyl-N'-(3-dimethylaminopropyl)carbodiimide, and dicyclohexyl carbodiimide, which are already exemplified, are particularly preferred.

[Carbon Nanotube Structure]

The carbon nanotube structure of the invention includes at least a carbon nanotube compound represented by the following structural formula B:

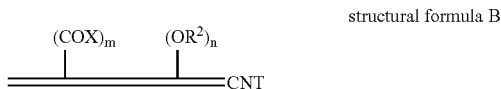

structural formula B wherein the moiety represented by the double lines represents a carbon nanotube; X represents $OR^1$ or a crosslinking site to be crosslinked to the functional group CO in other carbon nanotube compounds represented by the structural formula B in which $R^1$ represents a hydrogen atom, a substituted or unsubstituted alkyl group having one or two carbon atoms, a substituted or unsubstituted aryl group or a substituted or unsubstituted carbodiimide group; $R^2$ represents a substituted or unsubstituted alkyl group having from one to four carbon atoms; and m and n each independently represent an integer of 1 or more.

The carbon nanotube structure of the invention can be produced by the method described above in Paragraph [Process for the production of carbon nanotube structure]. The preferred examples of functional group COX and $OR^2$ in the carbon nanotube compound represented by the structural formula B contained in the carbon nanotube structure of the invention are as described as preferred examples of functional group $COOR^1$ and $OR^2$, respectively, in Clause <Carbon nanotube compound> of Paragraph [Carbon nanotube dispersion], excluding the case where X is a crosslinking site. The numbers of these functional groups, m and n, are as defined in the same clause as mentioned above.

The carbon nanotube constituting the skeleton of the carbon nanotube structure, i.e., carbon nanotube in the structural formula B may be either a single-walled carbon nanotube or a multi-walled carbon nanotube. Which the carbon nanotube is single-walled or multi-walled may be properly selected depending on the purpose, usage, desired function, etc. For example, in the case where the carbon nanotube structure is expected to be useful in electrical characteristics, a semiconducting single-walled carbon nanotube may be used.

In the case where X in the structural formula B of the carbon nanotube compound contained in the carbon nanotube structure of the invention is a crosslinking site, the structure is a network structure having carbon nanotubes crosslinked to each other (hereinafter occasionally referred simply to as "crosslinked carbon nanotube structure").

In the crosslinked carbon nanotube structure, the carbon nanotubes are kept networked or cured in matrix. Thus, the carbon nanotubes are connected to each other via crosslinking sites. In other words, the crosslinked carbon nanotube structure has carbon nanotubes closely connected to each other. Further, the crosslinked carbon nanotube structure is free of other binders and thus is substantially composed of carbon nanotube (without taking into account the functional group or other additives).

In the case where the carbon nanotube dispersion includes a crosslinking agent, the structure of the crosslinking site is determined by the crosslinking agent. In other words, the crosslinking site developed by the crosslinking reaction of the functional group contained in the carbon nanotube compound with the crosslinking agent has a crosslinked structure having residues left after the crosslinking reaction of the functional group connected to each other with a connecting group which is a residue left after the crosslinking reaction of the crosslinking agent.

In this case, the crosslinking agent which is a constituent of the carbon nanotube dispersion to be used in the production of the carbon nanotube structure is non-self-polymerizable. When the crosslinking agent is non-self-polymerizable, the connecting group in the crosslinked carbon nanotube structure finally formed is formed by the residue in only one crosslinking agent, making it possible to control the gap between the carbon nanotubes to be crosslinked to the size of the residue in the crosslinking agent used. As a result, a desired network structure of carbon nanotube can be obtained with a high producibility. Further, since there are no multiple of crosslinking agent interposed between the carbon nanotubes, the substantial density of the carbon nanotubes in the crosslinked carbon nanotube structure can be raised. Moreover, when the size of the residue in the crosslinking agent is reduced, the gap between the carbon nanotubes can be arranged such that the carbon nanotubes are kept extremely close to each other electrically and physically (kept substantially in direct contact with each other).

In the case where the crosslinked carbon nanotube structure is formed by a carbon nanotube dispersion containing a single non-self-polymerizable crosslinking agent, the crosslinking sites in the structure have the same crosslinked structure (Exemplification 1). Also in the case where the crosslinked carbon nanotube structure is formed by a carbon nanotube dispersion containing plural non-self-polymerizable crosslinking agents, the crosslinking sites in the structure are mainly composed of the crosslinked structure of the non-self-polymerizable crosslinking agent used (Exemplification 2).

On the other hand, in the case where the crosslinked carbon nanotube structure is formed by a carbon nanotube dispersion containing self-polymerizable crosslinking agents, regardless of which they are singular or plural, the crosslinking sites developed by the crosslinking of carbon nanotubes in the structure have many connecting groups having different connected (polymerized) numbers of crosslinking agents in admixture and thus cannot be mainly composed of specific crosslinked structure.

In other words, when as the aforementioned crosslinking agent there is selected a non-self-polymerizable crosslinking agent, the crosslinking sites developed by the crosslinking of the carbon nanotubes in the carbon nanotube structure are connected to functional groups with the residue in only one crosslinking agent and thus are mainly composed of the same crosslinked structure. The term "mainly composed of the same" as used herein is meant to indicate a concept including the case where the entire crosslinking site is mainly composed of a crosslinked structure formed by the non-self-polymerizable crosslinking agent used as described above (Exemplification 2), not to mention the case where all the crosslinking sites have the same crosslinked structure as described above (Exemplification 1).

In the case where the expression "mainly composed of the same" is used, the lower limit of the "proportion of the same crosslinking sites" in all the crosslinking sites cannot be unequivocally defined because it can be also estimated that the crosslinking site, for example, is provided with a functional group or crosslinked structure having a purpose different from the formation of network of carbon nanotubes. However, in order to realize high electrical or physical properties characteristic to carbon nanotube by a rigid network, the "proportion of the same crosslinking sites" in all the crosslinking sites is preferably 50% or more, more preferably 70% or more, even more preferably 90% or more, most preferably 100% by number. The proportion by number can be determined, e.g., by a method involving the measurement of the intensity ratio of absorption spectrum corresponding to the crosslinked structure using infrared spectrophotometry.

Thus, when the crosslinking site developed by the crosslinking of carbon nanotubes is a crosslinked carbon nanotube structure mainly composed of the same crosslinked structure, the carbon nanotube can be formed in a desired uniform network, making it possible to constitute uniform and good electrical or physical properties with expected high reproducibility.

The aforementioned connecting group preferably has a hydrocarbon as a skeleton. The term "hydrocarbon as a skeleton" as used herein is meant to indicate that the main chain moiety of the connecting group for connecting the residues left after the crosslinking reaction of the functional groups in the carbon nanotube to be crosslinked to each other is composed of hydrocarbon. Thus, the side chain moiety developed by the substitution of the hydrogen atom in this portion by other substituents is not taken into account. Of course, the connecting group is preferably entirely composed of hydrocarbon.

The number of carbon atoms in the aforementioned hydrocarbon is preferably from 2 to 10, more preferably from 2 to 5, even more preferably from 2 to 3. The aforementioned connecting group is not specifically limited so far as it has a valency of two or more.

On the other hand, in the case where the functional groups are chemically bonded directly to each other in the carbon nanotube dispersion without any crosslinking agent, the structure of the crosslinking site is a crosslinked structure formed by the connection of residues left after the crosslinking reaction of the function groups. In this case, too, the crosslinked carbon nanotube structure has carbon nanotubes connected closely to each other in matrix with a crosslinking site free of other binders or like materials. Accordingly, this crosslinked carbon nanotube structure can be regarded as being substantially composed of carbon nanotube alone.

Since the functional groups are reacted directly with each other to form a crosslinking site, the substantial density of carbon nanotubes in the crosslinked carbon nanotube structure can be raised, making it possible to constitute the gap between the carbon nanotubes such that they are in extremely close contact with each other both electrically and physically. Further, since the crosslinking site is formed by the chemical bond of functional groups and is mainly composed of the same crosslinked structure, the carbon nanotube can be formed in a desired uniform network, making it possible to constitute uniform and good electrical or physical properties with expected high reproducibility.

The combination of the kind of the crosslinking agents and crosslinking reactions used and the crosslinking site (X in the structural formula B) is exemplified in Table 2 below. Particularly preferred exemplifications of crosslinking site are set forth in the table.

TABLE 2

| | | Structure of X (crosslinking site) |
|---|---|---|
| Crosslinking agent | Ethylene glycol | —O(CH$_2$)$_2$O— |
| | Glycerin | —OCH$_2$CHOHCH$_2$O— |
| | | —OCH$_2$CH(CH$_2$OH)O— |
| | | —O—CH$_2$CHCH$_2$—O— <br> \| <br> O <br> \| |
| Dehydration condensation | | —O— |

As can be seen in Table 2 above, when as the crosslinking agent there is used glycerin, there can be three crosslinking sites. Since glycerin is trifunctional, the crosslinking agent in the upper two cases can be taken when two of the three OH groups contribute to crosslinking. When all the three OH groups contribute to crosslinking, the crosslinking agent in the lowermost case can be taken.

In the case where the carbon nanotube structure of the invention is in the form of a carbon nanotube film, the thickness of the carbon nanotube film can vary widely from extremely small value to great value depending on the purpose. When the carbon nanotube dispersion having a reduced carbon nanotube content is spread to a small thickness, an extremely thin film is formed. Similarly, when the content of carbon nanotube is raised, a thicker film is formed. Further, when the carbon nanotube dispersion is repeatedly spread, a carbon nanotube structure having an even thicker thickness can be obtained. Referring to an extremely thin carbon nanotube structure, it is sufficiently made possible to form a carbon nanotube structure having a thickness as small as about 1 nm or more. By repeatedly spreading such a thin film, a thick film can be formed limitlessly. The thickness of the film which can be attained by one time spreading is about 5 μm.

By pouring a carbon nanotube dispersion having an adjusted content into a mold, and then optionally crosslinking the carbon nanotube dispersion, a carbon nanotube structure having a desired shape can be formed.

In the case where the carbon nanotubes are not crosslinked, that is, no network structure is formed, the carbon nanotubes come in physical contact with each other to keep the carbon nanotube structure in a desired shape. This structure, too, is included in the concept of "structure" herein and is, of course, included in the category of carbon nanotube structure so far as it has the constitutions of the invention.

While the carbon nanotube structure of the invention and its production process have been described in detail and with reference to specific embodiments thereof, various changes and modifications can be made therein according to knowledge of the related art. It goes without saying that these various changes and modifications are included in the scope of the invention so far as they have the constitutions of the invention.

EXAMPLE

Examples will be described hereinafter. Of course, the invention is not limited to the following examples.

Example 1

1. Alkali Cleaning 200 ml of a 0.1 mol/l (0.1 N) aqueous solution of potassium hydroxide (KOH) is added to 500 mg of single-walled carbon nanotubes having a carboxyl group, SWCNT-COOHs (produced by Aldrich Inc.). The SWCNT-COOHs are dispersed by using an ultrasonic dispersing machine for 3 minutes, and then the dispersion is heated at 50° C. with stirring for 2 hours.

The dispersion is filtered through a polytetrafluoroethylene (PTFE) filter to collect the SWCNT-COOHs which are then cleaned sequentially with 3 l of a 0.1 mol/l (0.1 N) aqueous solution of KOH and 1 l of purified water.

To the SWCNT-COOHs is then added 0.2 l of a 6 mol/l (6 N) hydrochloric acid. The mixture is then stirred for 2 hours and filtered through a PTFE filter to collect SWCNT-COOHs which are then cleaned with purified water and dried. The yield of SWCNT-COOHs thus alkali-cleaned is 322 mg.

2. Methylation of Hydroxyl Group

To 322 mg of the SWCNT-COOHs thus obtained above is then added 200 ml of dioxane. The SWCNT-COOHs are dispersed by using an ultrasonic dispersing machine for 3 minutes, and then the dispersion is heated at 70° C. with stirring for 30 minutes. Thereafter, to the dispersion are added 0.89 g of KOH and 0.5 ml of dimethyl sulfate. The dispersion is then stirred at 0.2° C. with stirring for 2 hours.

The dispersion thus obtained is filtered through a PTFE filter to collect a dispersed material which are then cleaned sequentially with 0.2 l of dioxane and 1 l of purified water and dried. The product thus obtained is SWCNT-COOHs having methylated hydroxyl group and the yield of the product 220 mg.

3. Methylesterification of Carboxyl Group

To 103 mg of the SWCNT-COOHs having a methylated hydroxyl group thus obtained above are then added 200 ml of methanol and 10 ml of triethylamine. The SWCNT-COOHs are dispersed by using an ultrasonic dispersing machine for 3 minutes. Thereafter, to the dispersion is added 100 mg of DMT-MM (4-(4,6-dimethoxy-1,3,5-triazine-2-yl)-4-methyl-morpholinium chloride produced by Wako Pure Chemical Industries, Ltd.). The mixture is then stirred for 2 hours.

The dispersion thus obtained is filtered through a PTFE filter to collect a dispersed material which is then cleaned sequentially with 0.2 l of methanol and 1 l of purified water and dried. The product thus obtained is SWCNT-COOCH$_3$s having a methylated hydroxyl group. The yield of the product is 70 mg.

4. Preparation of Carbon Nanotube Dispersion

To a 20% methanol glycerin solution (1:4 (by volume) mixture of methanol and glycerin) as a dispersion medium are added the SWCNT-COOCH$_3$s having a methylated hydroxyl group obtained above to a concentration of 0.5 mg/ml to prepare a carbon nanotube dispersion of Example 1.

The carbon nanotube dispersion of Example 1 thus obtained has carbon nanotube compounds dispersed therein so fairly that the carbon nanotube compounds are not precipitated even when allowed to stand for 12 hours.

Comparative Example 1

1. Alkali Cleaning

SWCNT-COOHs are subjected to alkali cleaning in the same manner as in Example 1 (1. Alkali cleaning). The yield of the SWCNT-COOHs thus alkali-cleaned was 322 mg.

3. Methylesterification of Carboxyl Group

The SWCNT-COOHs thus obtained above are then subjected to the following processing without via the procedure in Example 1 (2. Methylation of hydroxyl group).

To 100 mg of the SWCNT-COOHs obtained at the aforementioned step (1. Alkali cleaning) are then added 200 ml of methanol and 10 ml of triethylamine. The SWCNT-COOHs are dispersed by using an ultrasonic dispersing machine for 3 minutes. Thereafter, to the dispersion is added 100 mg of DMT-MM (4-(4,6-dimethoxy-1,3,5-triazine-2-yl)-4-methyl-morpholinium chloride produced by Wako Pure Chemical Industries, Ltd.). The mixture is then stirred for 2 hours.

The dispersion thus obtained is filtered through a PTFE filter to collect a dispersed material which is then cleaned sequentially with 0.2 l of methanol and 1 l of purified water and dried. The product thus obtained is SWCNT-COOCH$_3$ having an unmethylated hydroxyl group. The yield of the product is 80 mg.

4. Preparation of Carbon Nanotube Dispersion

To a 20% methanol glycerin solution (1:4 (by volume) mixture of methanol and glycerin) as a dispersion medium are added the SWCNT-COOCH$_3$s having an unmethylated hydroxyl group obtained above to a concentration of 0.5 mg/ml to prepare a carbon nanotube dispersion of Comparative Example 1.

The carbon nanotube dispersion of Comparative Example 1 thus obtained contains COOCH$_3$ and thus showed a corresponding dispersibility. However, when the carbon nanotube dispersion is allowed to stand for 12 hours, the carbon nanotube compounds are found to be slightly precipitated.

Example 2

A carbon nanotube dispersion in Example 2 is prepared from the SWCNT-COOHs having a methylated hydroxyl group obtained at the step (2. Methylation of hydroxyl group) in the same manner as the step (4. Preparation of carbon nanotube dispersion) in Example 1 without via the step (3. Methylesterfication of carboxyl group).

The carbon nanotube dispersion in Example 2 thus obtained has carbon nanotube compounds dispersed therein so fairly that the carbon nanotube compounds are not precipitated even when allowed to stand for 12 hours.

In the carbon nanotube dispersion of the present example, SWCNT-COOH is not alkylesterified and remains to be COOH, which does not undergo crosslinking reaction with glycerin (polyol). Thus, the 20% methanol glycerin solution acts as a mere dispersion medium.

<Preparation of Sample Substrate>

(Hydrophilicization)

A substrate over which spreading is to be made (silicon wafer having a size of 76.2 mm (3 inch) square with an oxide film having a thickness of 1 mm) is subjected to UV ashing at 100° C. for 10 minutes to prepare a substrate having a hydrophilic surface (hereinafter referred to as "hydrophilic substrate"). When a water droplet is dropped on the surface of the substrate to measure the contact angle of the surface of the substrate with respect to water, the water droplet is spread over the surface of the substrate, making it impossible to measure the contact angle. Accordingly, the contact angle of the surface of the substrate with respect to water is extremely close to 0°.

(Hydrophobicization)

The hydrophilic substrate thus obtained above is allowed to stand in a saturated aminosilane vapor (temperature: 27° C.) for 4 hours so that an aminosilane group is added to the surface of the substrate to prepare a substrate having a hydrophobic surface (hereinafter referred to as "hydrophobic substrate"). The contact angle of the surface of the substrate with respect to water is then measured. The result is 98°.

<Formation of Carbon Nanotube Film>

2 ml of each carbon nanotube dispersion of the examples and the comparative example is spread over the surface of the hydrophilic substrate thus obtained above by a spin coating method (4,000 rotations; 10 seconds) while being dropped onto the surface of the substrate. Thereafter, the spread is heated to 150° C. for 5 minutes so that it is cured to form a carbon nanotube film.

Each carbon nanotube dispersion of Examples 1 and 2 is spread and cured on the surface of the hydrophobic substrate obtained above in the same manner as the hydrophilic substrate to form a carbon nanotube film (carbon nanotube structure).

<Confirmation of State of Carbon Nanotube Film>

(Observation of Enlarged Image of Surface)

Figure 2:
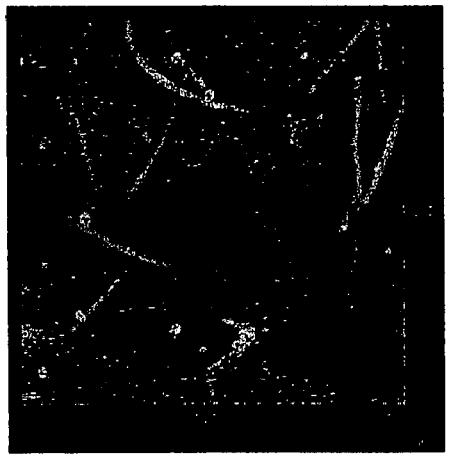
FIG. 2 is a view showing AFM images (10,000× magnification) of a carbon nanotube film formed on the surface of a hydrophilic substrate by the carbon nanotube dispersion of Comparative Example 1.
Figure 2:
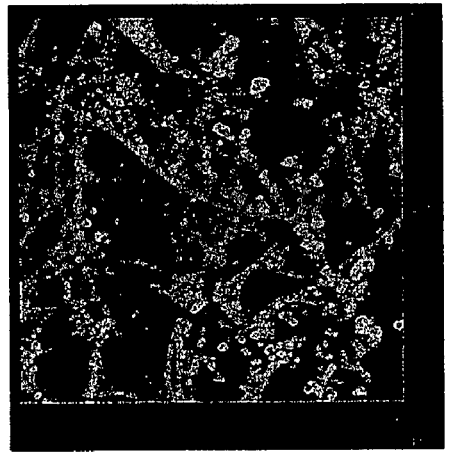
Figure 2:
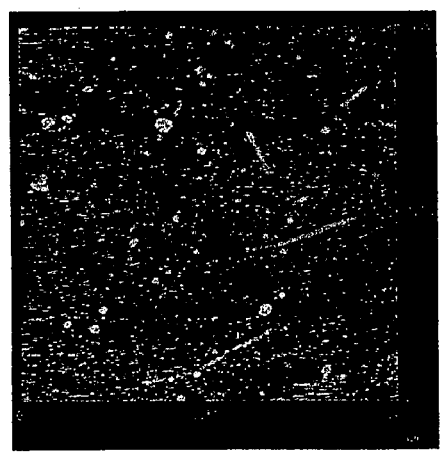
Figure 2:
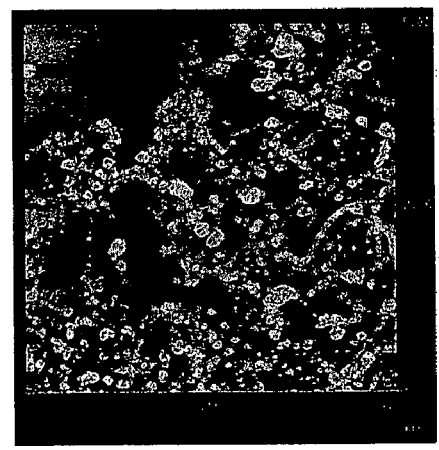
Figure 3:
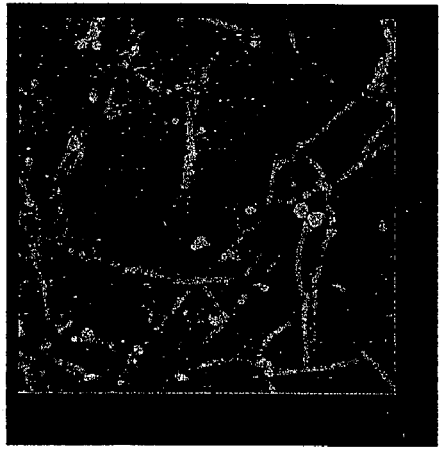
FIG. 3 is a view showing AFM images (10,000× magnification) of a carbon nanotube film formed on the surface of a hydrophilic substrate by the carbon nanotube dispersion of Example 2.
Figure 3:
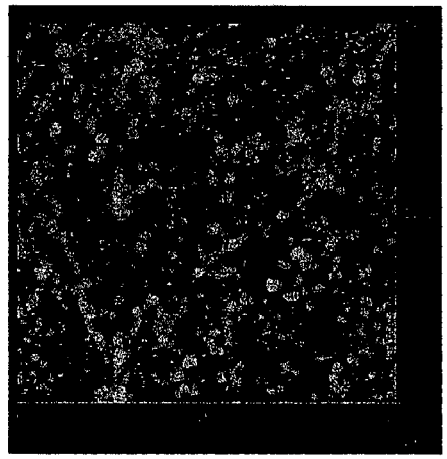
Figure 3:
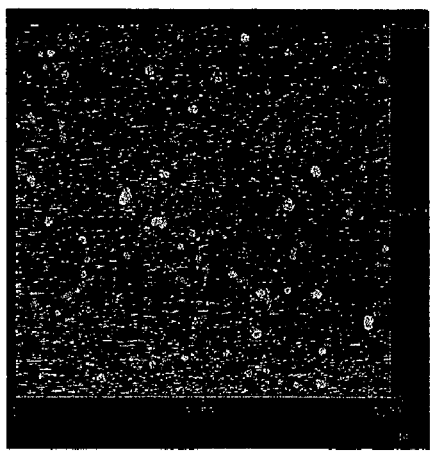
Figure 3:
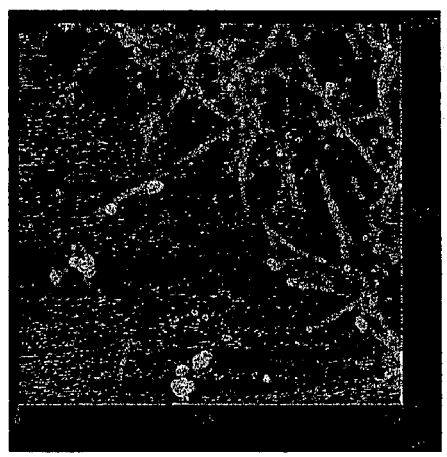
Figure 4:
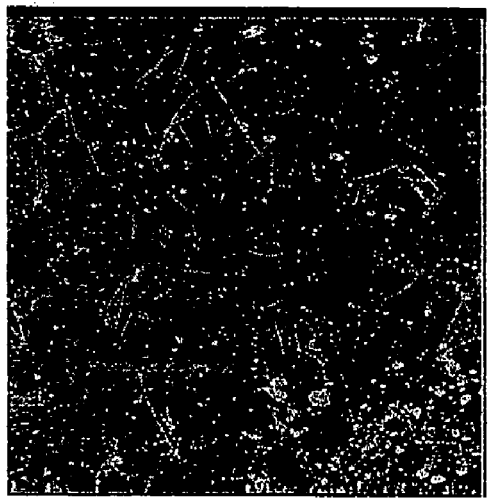
FIG. 4 is a view showing AFM images (10,000× magnification) of a carbon nanotube film formed on the surface of a hydrophobic substrate by the carbon nanotube dispersion of Examples 1 and 2.
Figure 4:
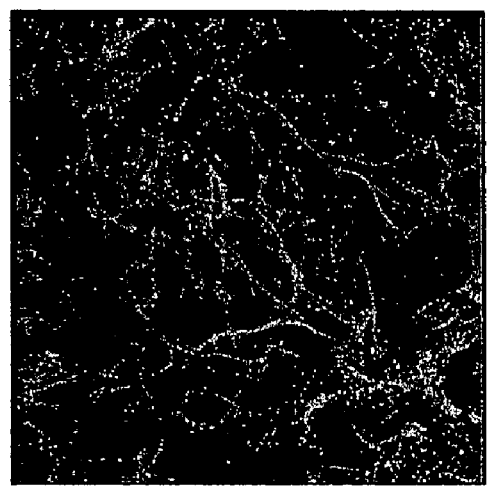

Each carbon nanotube film formed by each carbon nanotube dispersion of the examples and the comparative example is observed for image enlarged at 10,000× magnification using AFM. For this observation, each carbon nanotube film formed on the surface of the hydrophilic substrate is photographed at four arbitrary positions. Each carbon nanotube film formed on the surface of the hydrophobic substrate is photographed on one position having a representative state. AFM image of these points are shown in FIGS. 1 to 4.

(Examination of Thickness)

Each carbon nanotube structure formed on the surface of the hydrophilic substrate by each carbon nanotube dispersion of the examples and the comparative example is observed for a range of 5 μm square using AFM. The roughness of six arbitrary positions are measured by AFM and then averaged (corresponding to arithmetic average roughness Ra as defined in JIS).

The results are set forth in Table 3 below.

TABLE 3

| | Position 1 | Position 2 | Position 3 | Position 4 | Position 5 | Position 6 | Standard deviation |
|---|---|---|---|---|---|---|---|
| Example 1 | 3.2 | 3.5 | 3.7 | 3.9 | 2.8 | 2.6 | 0.5 |
| Comparative Example 1 | 0.8 | 5.5 | 0.7 | 6.8 | 1.8 | 10.9 | 4.1 |
| Example 2 | 2.4 | 8.4 | 2.4 | 1.1 | 12.7 | 3.0 | 4.6 |

(Unit: nm)

The film of Example 1 is homogeneous as compared with the film of Comparative Example 1. The film of Example 2 is poor in homogeneity but has a high dispersibility as a solution as described above and thus is observed to have many homogeneous partial regions formed therein as compared with the film of Comparative Example 1.

What is claimed is:

1. A carbon nanotube dispersion comprising:
   a carbon nanotube compound represented by structural formula A; and
   a dispersion medium in which the carbon nanotube is dispersed or dissolved,

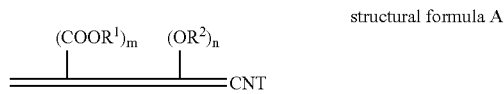

structural formula A wherein a moiety represented by double lines represents a carbon nanotube;
   $R^1$ represents a hydrogen atom, a substituted or unsubstituted alkyl group having one or two carbon atoms, a substituted or unsubstituted aryl group or a substituted or unsubstituted carbodiimide group;
   $R^2$ represents an unsubstituted alkyl group having from 1 to 4 carbon atoms; and
   m and n each independently represents an integer of 1 or more.

2. The carbon nanotube dispersion according to claim 1, further comprising:
   a crosslinking agent that crosslinks the carbon nanotube compounds by chemically bonding functional groups containing $R^1$ in structural formula A to each other.

3. The carbon nanotube dispersion according to claim 1, wherein $R^1$ in structural formula A is a substituted or unsubstituted alkyl group having one or two carbon atoms.

4. The carbon nanotube dispersion according to claim 1, wherein the dispersion medium acts also as a crosslinking agent for crosslinking the carbon nanotube compounds by chemically bonding functional groups containing $R^1$ in structural formula A to each other.

5. The carbon nanotube dispersion according to claim 1, wherein the carbon nanotube in the structural formula A is a single-walled carbon nanotube.

6. A production method of a carbon nanotube structure comprising:
   preparing a carbon nanotube dispersion, wherein the preparing comprises dispersing or dissolving at least a carbon nanotube compound represented by structural formula A in a dispersion medium; and
   supplying the carbon nanotube dispersion onto a surface of a substrate,

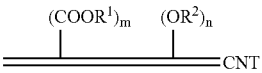

structural formula A wherein a moiety represented by double lines represents a carbon nanotube;
   $R^1$ represents a hydrogen atom, a substituted or unsubstituted alkyl group having one or two carbon atoms, a substituted or unsubstituted aryl group or a substituted or unsubstituted carbodiimide group;
   $R^2$ represents an unsubstituted alkyl group having from 1 to 4 carbon atoms; and
   m and n each independently represents an integer of 1 or more.

7. The production method of the carbon nanotube structure according to claim 6,
   wherein the preparing comprises adding a crosslinking agent that crosslinks the carbon nanotube compounds by chemically bonding functional groups containing $R^1$ in structural formula A to each other.

8. The production method of the carbon nanotube structure according to claim 7,
   wherein $R^1$ in structural formula A is a substituted or unsubstituted alkyl group having one or two carbon atoms.

9. The production method of the carbon nanotube structure according to claim 6,
   wherein the dispersion medium acts also as a crosslinking agent for crosslinking the carbon nanotube compounds by chemically bonding functional groups containing $R^1$ in structural formula A to each other.

10. The production method of the carbon nanotube structure according to claim 6,
wherein the carbon nanotube in structural formula A is a single-walled carbon nanotube.

11. The production method of a carbon nanotube structure according to claim 6, further comprising:
crosslinking the carbon nanotube compounds by chemically bonding functional groups containing $R^1$ in structural formula A to each other after the supplying the carbon nanotube dispersion onto the surface of the substrate.

12. The production method of a carbon nanotube structure according to claim 6,
wherein the dispersion medium comprises at least one of water and a water-soluble solvent at the preparing the dispersion; and
the substrate at supplying the carbon nanotube dispersion is a substrate having a hydrophilic surface or a substrate having a hydrophilicization-processed surface.

13. A carbon nanotube structure comprising:
a carbon nanotube compound represented by structural formula B,

structural formula B wherein a moiety represented by double lines represents a carbon nanotube;

X represents $OR^1$ or a crosslinking site, wherein $R^1$ represents a hydrogen atom, a substituted or unsubstituted alkyl group having one or two carbon atom(s), a substituted or unsubstituted aryl group or a substituted or unsubstituted carbodiimide group and the crosslinking site are crosslinked to a carbonyl group in other carbon nanotube compounds represented by structural formula B;

$R^2$ represents an unsubstituted alkyl group having from 1 to 4 carbon atom(s); and m and n each independently represents an integer of 1 or more.

14. The carbon nanotube structure according to claim 13,
wherein X represents the crosslinking site;
the crosslinking site has a chemical structure selected from the group consisting of —O—, —O(CH$_2$)$_2$O—, —OCH$_2$CHOHCH$_2$O—, —OCH$_2$CH(CH$_2$OH)O— and a following structure; and

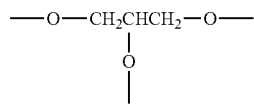

the carbon nanotube structure has a network structure of the carbon nanotubes.

15. The carbon nanotube structure according to claim 13,
wherein the carbon nanotube in structural formula B is a single-walled carbon nanotube.

* * * * *